US007168591B1

(12) United States Patent
Miller

(10) Patent No.: US 7,168,591 B1
(45) Date of Patent: Jan. 30, 2007

(54) TRASH BAG DISPENSER

(76) Inventor: Christopher J. Miller, 47 Glen Dr., Peabody, MA (US) 01960

( * ) Notice: Subject to any disclaimer, the term of this patent is extended or adjusted under 35 U.S.C. 154(b) by 249 days.

(21) Appl. No.: 10/913,814

(22) Filed: Aug. 6, 2004

(51) Int. Cl.
*B65G 59/00* (2006.01)

(52) U.S. Cl. ............ 221/199; 220/495.06; 220/495.07; 220/495.11

(58) Field of Classification Search ................ 221/199; 220/495.06, 495.07, 495.11
See application file for complete search history.

(56) References Cited

U.S. PATENT DOCUMENTS 3,451,453 A 6/1969 Heck
4,319,694 A 3/1982 Nehrbass et al.
4,349,123 A 9/1982 Yang
4,721,226 A 1/1988 Yurko
4,823,979 A 4/1989 Clark, Jr.
4,955,505 A 9/1990 Battaglia
5,000,340 A * 3/1991 Leggio .................. 220/495.07
5,115,935 A * 5/1992 Lemongelli ............ 220/495.07
5,322,180 A * 6/1994 Ker ....................... 220/495.07
5,405,041 A * 4/1995 Van Brackle .......... 220/495.07
5,458,259 A 10/1995 Falk
5,542,567 A * 8/1996 Julius .......................... 221/63
5,881,900 A 3/1999 Meshorer
6,193,095 B1 * 2/2001 McNeil ................. 220/495.07
6,729,498 B2 * 5/2004 Yelton et al. ................. 221/63
2005/0029281 A1 * 2/2005 Westermann et al. ....... 221/199
2005/0092753 A1 * 5/2005 Best ...................... 220/495.07

* cited by examiner

*Primary Examiner*—David H. Bollinger
(74) *Attorney, Agent, or Firm*—Joseph R. Birkner

(57) ABSTRACT

A trash bag dispenser, for receiving a trash bag continuously joined to and separable from another trash bag, for receiving a trash receptacle and for dispensing the trash bag from the trash receptacle is provided. The trash bag dispenser comprising a housing for containing the trash bag and a cover having a slot therein for guiding the trash bag therethrough. The cover is movably connected to the housing and integral therewith for allowing the cover to capture the trash bag and to allow the trash bag to freely move when urged through the slot. A closure, comprises a snap button fastener. The trash bag dispenser is attachable to an interior of the trash receptacle with an adhesive backed hook and loop type fastener.

4 Claims, 2 Drawing Sheets

TRASH BAG DISPENSER

FIELD OF THE INVENTION

This invention relates generally to trash bag dispensers. More particularly, the present invention relates to a trash bag dispenser which is attachable to the interior bottom of a trash receptacle for the purpose of dispensing trash bags therefrom.

BACKGROUND OF THE INVENTION

Trash bags are typically placed into trash receptacles by alternately emptying them when full and replacing them with clean trash bags by various persons including cleaning crews. The problem is that a user must find trash bags from the supply closet or from a cart and then manually replace the trash bag into the trash receptacle. More often than not, replacement trash bags are not readily available which causes an inconvenience and a time consuming operation.

Presently, specialty trash receptacles are available with various trash bag dispensers built into and becoming an integral part thereof which forces a user purchase the entire trash receptacle rather than just the trash bag dispenser alone. This is expensive and inconvenient since a user typically already has several trash receptacles including waste baskets in a home or office.

None of the above prior art devices disclose a trash bag dispenser which can readily fit any existing trash receptacle.

In view of the above mentioned problems and limitations associated with conventional attempts to disperse trash bags, it was recognized by the present inventor that there is an unfulfilled need for a trash bag dispenser that conveniently disperses trash bags, fits into any trash receptacle and one which is conveniently refillable. Accordingly, it becomes clear that there is a great need for a trash bag dispenser which overcomes the disadvantages of the prior art methods and devices. Such a trash bag dispenser should be one that works as desired, is easy to use and is economically manufactured.

SUMMARY OF THE INVENTION

It is therefore an object of this invention to provide a trash bag dispenser which avoids the aforementioned problems of prior art devices.

It is another object of this invention to provide a trash bag dispenser that removably mounts into a trash receptacle without modification to the trash receptacle.

It is another object of this invention to provide a trash bag dispenser that has a housing integrally molded with a cover. It is a further object of this invention to provide a trash bag dispenser that is designed to be loaded and reloaded with a trash bag in the form of a roll.

It is a another object of this invention to provide a trash bag dispenser that allows the trash bag to freely move in the housing during dispensing without the need for a spindle.

It is a further object of this invention to provide a trash bag dispenser that may be reloaded remotely by removing it from the trash receptacle.

It is a further object of this invention to provide a trash bag dispenser that may be reloaded in place, without removing it from the trash receptacle.

It is a further object of this invention to provide a trash bag dispenser that is sanitary and refillable.

It is a further object of this invention to provide a trash bag dispenser which may be manufactured from readily available materials by conventional manufacturing processes.

It is still a further object of this invention to provide a trash bag dispenser that is simple in design, simple to manufacture, low in cost, safe and is easy to use.

This invention results from the realization that there is a great need for an economical trash bag dispenser which uses trash bags readily available in rolls, or flatly stacked trash bags, one which fits into available trash receptacles without having to purchase trash receptacles having specially designed built-in trash bag dispensers and one which can be readily reloaded either in the trash bag receptacle, or remotely at a more convenient location. The resulting invention provides such benefits.

According to a first aspect of the present invention, disclosed is a trash bag dispenser for receiving a trash bag continuously joined to and separable from another trash bag, for receiving a trash receptacle and for dispensing the trash bag from the trash receptacle. The trash bag dispenser comprising a housing for containing the trash bag and a cover having a slot therein for guiding the trash bag therethrough. The cover is movably connected to the housing and integral therewith for allowing the cover to capture the trash bag and to allow the trash bag to freely move when urged through the slot. Closure means, comprises a snap button fastener and means for attaching the trash bag dispenser to an interior of the trash receptacle comprises an adhesive backed hook and loop type fastener.

The second aspect, in accordance with the present invention, is a special case of the first aspect of this invention with additional features.

The third aspect of the present invention discloses a method of making a trash bag dispenser.

The fourth aspect of the present invention discloses a method for dispensing a trash bag from a trash receptacle.

DETAILED DESCRIPTION OF ILLUSTRATIVE EMBODIMENTS

Figure 1:
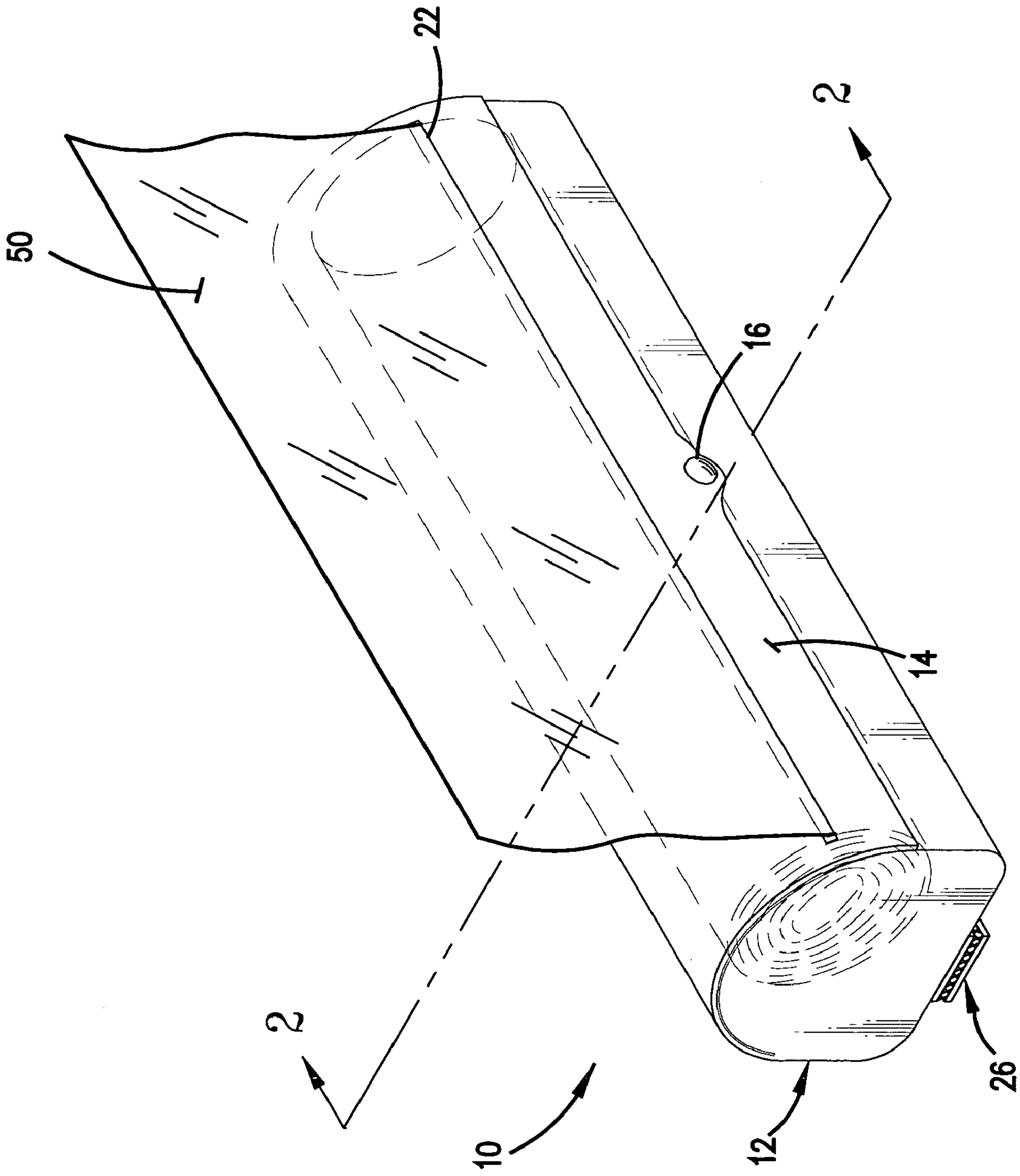
FIG. 1 is a perspective view of an embodiment of a trash bag dispenser of the instant invention.
Figure 2:
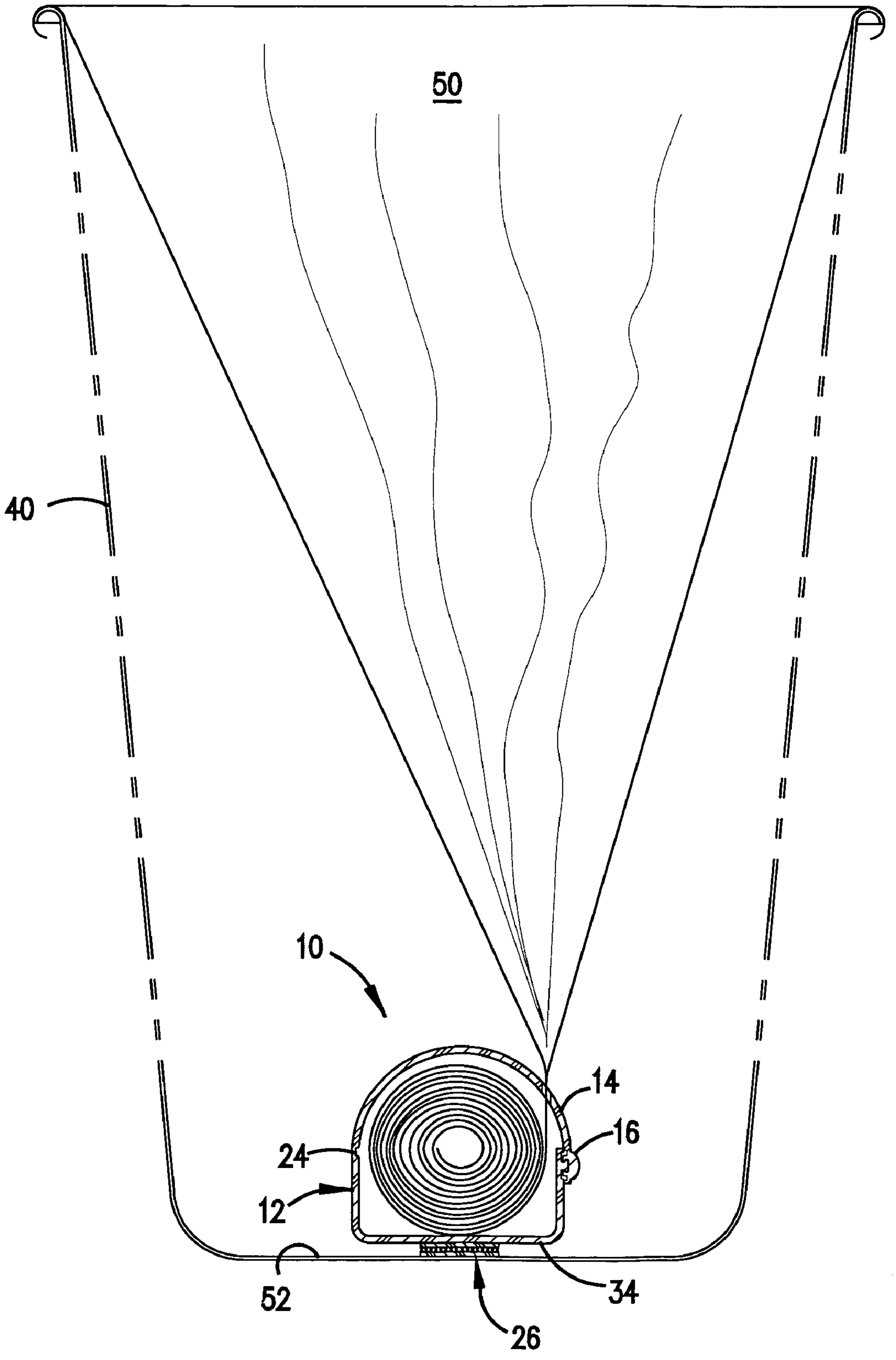
FIG. 2 is a cross sectional view taken along the line 2—2 of FIG. 1 of the instant invention showing the trash bag dispenser installed in a trash receptacle with a trash bag in place and with the trash receptacle being shown in phantom.

Looking more particularly to the drawings, there is shown in FIGS. 1 and 2 an embodiment of a trash bag dispenser, which is generally indicated at 10, according to an embodiment of the present invention.

FIG. 1 is a perspective view of an embodiment of the trash bag dispenser 10 of the instant invention.

As best seen in FIG. 1, the trash bag dispenser 10, preferably fabricated by plastic molding, comprises a housing 12 having a cover 14 with a living hinge 24. The housing 12 preferably is semicircular in shape with a flat bottom for dispensing and for mounting purposes. The cover 14 has a closure 16 which may include a snap button fastener molded into the housing 12 and into the cover 14 for loading a trash bag 50 in the trash bag dispenser 10. The trash bag 50 preferably is in the form of a roll with perforations for separation purposes during use when fed through a slot 22 in the cover 14. The slot 22 being positioned off-center near the closure 16 to allow the trash bag 50 to be readily captured by the cover 14 to facilitate feeding thereof. When in place in the trash bag dispenser 10, the held captive trash bag 50, is allowed to freely rotate therein without the need for any roller brackets, spindles or guides. This simplifies the design and the operation of the trash bag dispenser 10. It is understood that the trash bag dispenser 10 may be provided preloaded with the trash bag 50 in place or empty, without the trash bag 50, ready to receive the trash bag 50. The trash bag 50 may be conveniently replaced with readily available plastic trash bags. The housing 12 has an attachment means 26 for allowing the trash bag dispenser 10 to be removably installed in a trash receptacle 40 such as a waste basket, barrel, container or the like to facilitate loading of the trash bag 50.

The attachment means 26 includes a hook and a loop type fastener with an adhesive, preferably is in the form of a peelable strip on each side of the hook and of the loop portions for attaching to the bottom 34 of the housing 12 and to an interior base 52 of the trash receptacle 40. The hook and the loop being removably engageable so that the trash bag dispenser 10 may be removed from the trash receptacle 40 for conveniently loading in a comfortable position such as by holding it in the hands without having to bend over into the trash receptacle 40 during loading. It is understood that the trash bag dispenser 10 may also be left in place in the trash receptacle 40 and loaded without having to remove it therefrom.

Operation is best understood by referring to FIG. 2 which shows a cross sectional view of an embodiment of the instant invention showing the trash bag dispenser 10 installed in the trash receptacle 40 with the trash bag 50 in place.

The trash bag dispenser 10 is preloaded with the trash bag 50, preferably in the form of a roll, by placing the trash bag 50 into the housing 12, feeding the trash bag 50 through the slot 22 with a portion exposed therethrough for gripping purposes and closing the cover 14 and securing it with the closure 16. The hook portion of the attachment means 26 being attached to the bottom 34 of the housing 12 with the adhesive and the loop being engaged with the hook, afterwhich the adhesive on the loop portion is exposed and the trash bag dispenser 10 is placed into the trash receptacle 40 and rests on the interior base 52 ready for use.

A user simply pulls upward on the trash bag 50 having perforations, a sufficient amount to separate it thereby releasing it from the roll and leaving a portion exposed for the next use. The trash bag 50 is then pulled over the edges of the trash receptacle 40, in a conventional manner, covering the opening thereof. When the trash bag 50 is full of waste, it is simply removed and disposed of. The next trash bag 50 is then automatically dispensed in the above manner repeatedly until the trash bag 50 is depleted, afterwhich the trash bag dispenser 10 may be removed from the trash receptacle 40 with the loop portion of the attachment means 26 remaining fixed to the interior base 52 of the trash receptacle 40.

The applicant solved a known problem in the prior art in configuring the trash bag dispenser 10 semicircular in shape to allow the trash bag 50 to be in a roll form so that it can freely rotate within the housing 12 and with a flat bottom to permit mounting into the trash receptacle 40 and in order to achieve the superior performance compared to prior art devices. The flat bottom design also permits the use of flat stackable trash bags in addition to rolled trash bags. Surprisingly, the instant invention provides an added advantage and recognizes a problem and adequately and completely addresses an unfulfilled need, in that the trash bag dispenser 10, in the manner disclosed, in effect, defines a highly functional trash bag dispenser 10 that is superior to conventional combination trash bag dispenser and trash receptacles mentioned above. This is due entirely to the particular way the applicant designed and fabricated the universally usable trash bag dispenser 10, not taught in the prior art, without the need to purchase a separate trash receptacle 40. By doing so, the applicant is able to use inexpensive materials in the fabrication without sacrificing performance, rather, achieving superior unexpected results, due to the particular construction which is cost effective.

The trash bag dispenser 10 may be constructed in a variety of sizes and style variations to accommodate various containers and trash bags including flatly stacked trash bags without departing from the scope of this disclosure.

One practical advantage of the invention is that it provides a convenient, practical, low cost, trash bag dispenser 10 which allows a user to conveniently and in a sanitary manner, handle trash disposal. Still another advantage is that the trash bag dispenser 10 is designed for ease of manufacture by standard methods and by using readily available materials particularly chosen for the problem solved.

Of course, a wide variety of further uses and advantages of the present invention will become apparent to one skilled in the art. As disclosed, it is apparent that one skilled in the art will realize that the foregoing discussion outlines the more important features of the invention to enable a better understanding of the instant invention and to instill a better appreciation of the inventors contribution to the art. It must be clear that the disclosed details of construction, descriptions of geometry and illustrations of inventive concepts are mere examples of possible manifestations of the invention.

Although the invention has been shown and described with reference to certain illustrative embodiments, those skilled in the art undoubtedly will find alternative embodiments obvious after reading this disclosure. With this in mind, the following claims are intended to define the scope of protection to be afforded the inventor, and those claims shall be deemed to include equivalent constructions insofar as they do not depart from the spirit and scope of the present invention.

What is claimed is:

1. A trash bag dispenser for receiving a trash bag continuously joined to and separable from another trash bag, for receiving a trash receptacle and for dispensing the trash bag from the trash receptacle and said trash bag dispenser being independent of and removable from the trash receptacle for selectively replenishing the trash bag in one of, remotely, in a more readily accessible location away from the trash receptacle to avoid having to refill the trash bag when said trash bag dispenser is installed in the trash receptacle and by reloading said trash bag dispenser in place with the trash bag, without removing said trash dispenser from the trash receptacle and for being useable with and retrofittable to a wide range of existing trash receptacles, said trash bag dispenser comprising:

a housing, semicircular in shape with a flat bottom, for receiving the trash bag;

a cover having a slot therein disposed off-center in close proximity to a closure means attached to said cover and to said housing with the slot being rectangular in shape and being longer that the width of the trash bag and partially extending longitudinally across said cover for guiding the trash bag therethrough; so that a surface of the trash bag being in close proximity to a vertical wall of the trash receptacle when the trash bag is being removed through the off-center slot of said housing with the trash bag being further guided thereby the vertical wall of the trash receptacle to facilitate placement thereof for use therein the trash receptacle;

said cover being curved and movably connected to said housing with a living hinge continuously extending across a length of said housing and being centrally disposed at a junction of a portion of the semicircular part of said housing and a vertical wall upwardly extending from said flat bottom to the semicircular part of said housing;

said cover and said housing being integrally formed by plastic molding for allowing said cover to capture the trash bag and to allow the trash bag to freely move when urged through the off-center slot;

and means for attaching said trash bag dispenser to an interior of the trash receptacle.

2. The trash bag dispenser of claim 1 wherein said closure means is a snap button fastener.

3. The trash bag dispenser of claim 1 wherein said means for attaching said trash bag dispenser to the interior of the trash receptacle is a hook and a loop type fastener.

4. The trash bag dispenser of claim 3 wherein said hook has an adhesive on one side for attaching to a bottom of said housing and said loop has an adhesive on one side for attaching to a base at the interior of the trash receptacle and said hook releasably engageable with said loop.

* * * * *